United States Patent
Park et al.

(10) Patent No.: US 12,458,816 B2
(45) Date of Patent: Nov. 4, 2025

(54) MULTI FUNCTIONAL PROBE CAPABLE OF SHIELDING ELECTROMAGNETIC WAVE

(71) Applicant: CERAGEM Co., Ltd., Cheonan-si (KR)

(72) Inventors: Yong son Park, Anyang-si (KR); Dong Myoung Lee, Anyang-si (KR); Sang Ho Choi, Cheonan-si (KR); Jin Cheol Park, Cheonan-si (KR); Yong Seob Seo, Cheonan-si (KR); Yong Hee Kim, Cheonan-si (KR); Jaehwa Kim, Cheonan-si (KR)

(73) Assignee: CERAGEM Co., Ltd., Cheonan-si (KR)

( * ) Notice: Subject to any disclaimer, the term of this patent is extended or adjusted under 35 U.S.C. 154(b) by 77 days.

(21) Appl. No.: 17/161,510

(22) Filed: Jan. 28, 2021

(65) Prior Publication Data
US 2021/0236859 A1    Aug. 5, 2021

(30) Foreign Application Priority Data

Jan. 31, 2020    (KR) ........................ 10-2020-0011842

(51) Int. Cl.
*A61N 7/00*    (2006.01)
*A61N 5/06*    (2006.01)

(52) U.S. Cl.
CPC ............. *A61N 7/00* (2013.01); *A61N 5/0616* (2013.01); *A61N 2005/0651* (2013.01); *A61N 2007/0034* (2013.01)

(58) Field of Classification Search
CPC .................. A61N 7/00; A61N 5/0616; A61N 2005/0651; A61N 2007/0034;
(Continued)

(56) References Cited

U.S. PATENT DOCUMENTS 5,721,463 A * 2/1998 Snyder ................. A61B 8/4483
                                                   310/341
2002/0120218 A1    8/2002 Oba et al.
(Continued)

FOREIGN PATENT DOCUMENTS

CN    1765329 A    5/2006
CN    106489088 A    3/2017
(Continued)

OTHER PUBLICATIONS

International Search Report of PCT Application No. PCT/KR2021/001100—4 pages (May 10, 2021).
(Continued)

*Primary Examiner* — Adil Partap S Virk
(74) *Attorney, Agent, or Firm* — Knobbe, Martens, Olson & Bear, LLP (57) ABSTRACT

Disclosed is a multi-functional probe capable of shielding electromagnetic waves in which an ultrasonic driver circuit and an ultrasonic oscillation element are surrounded by a shielding member in a state in which the ultrasonic driver circuit and the ultrasonic oscillation element are disposed close to each other and which allows a material of a head, to which ultrasonic waves are transmitted, to be changed to a non-conductive material and prevent moisture from being introduced into the probe. To this end, the multi-functional probe includes a cover part accommodating the ultrasonic driver circuit and the ultrasonic oscillation element, a fixing part fixing the ultrasonic driver circuit and the ultrasonic oscillation element in the cover part, and a shield part configured to block electromagnetic waves generated by the ultrasonic driver circuit and the ultrasonic oscillation element.

18 Claims, 9 Drawing Sheets

(58) Field of Classification Search
CPC .... A61N 2005/0644; A61N 2007/0056; A61B 2090/0481; A61F 7/007; A61F 2007/0071; A61F 2007/0052; A61F 2007/0087; A61H 23/0245; A61H 2201/0111; H05K 9/0007; H05K 9/0015
See application file for complete search history.

(56) References Cited

U.S. PATENT DOCUMENTS

| | | | | |
|---|---|---|---|---|
| 2004/0073118 | A1* | 4/2004 | Peszynski | A61B 8/12 600/459 |
| 2004/0122319 | A1* | 6/2004 | Mehi | A61B 8/14 600/443 |
| 2004/0171970 | A1* | 9/2004 | Schleuniger | A61F 7/02 601/3 |
| 2006/0100513 | A1* | 5/2006 | Hashimoto | G10K 11/004 600/437 |
| 2007/0016059 | A1* | 1/2007 | Morimoto | A61B 8/4455 600/459 |
| 2008/0194961 | A1* | 8/2008 | Randall | G01S 7/52017 600/459 |
| 2009/0240310 | A1* | 9/2009 | Kennedy | A61N 5/0616 607/88 |
| 2010/0004543 | A1* | 1/2010 | Ahlund | A61B 1/00142 600/459 |
| 2010/0026141 | A1* | 2/2010 | Osawa | G10K 11/004 310/335 |
| 2011/0077557 | A1* | 3/2011 | Wing | A61B 8/546 601/2 |
| 2011/0213248 | A1* | 9/2011 | Murakami | A61B 8/12 601/2 |
| 2011/0230794 | A1* | 9/2011 | van Groningen | A61B 8/546 601/2 |
| 2013/0168532 | A1* | 7/2013 | Schmid | G01N 21/63 250/205 |
| 2013/0331681 | A1* | 12/2013 | Tokita | A61B 5/0095 600/407 |
| 2014/0206978 | A1* | 7/2014 | Ackerman | A61B 5/0095 600/407 |
| 2015/0065883 | A1* | 3/2015 | Lee | B06B 1/0681 600/459 |
| 2017/0065289 | A1* | 3/2017 | Hsu | A61B 17/2251 |
| 2018/0271372 | A1* | 9/2018 | Lee | A61B 5/0035 |
| 2018/0287465 | A1* | 10/2018 | Lin | H02K 33/16 |
| 2019/0290305 | A1* | 9/2019 | Engles | A61N 7/00 |
| 2020/0169046 | A1* | 5/2020 | Kanakasabhapathi | H01R 13/6658 |
| 2020/0170625 | A1* | 6/2020 | Motoki | G01K 11/26 |
| 2020/0176922 | A1* | 6/2020 | Jagminas | H01R 13/512 |
| 2020/0196985 | A1* | 6/2020 | Mallory | A61B 8/4494 |
| 2020/0390646 | A1* | 12/2020 | Joh | A61H 23/0245 |
| 2022/0395256 | A1* | 12/2022 | Løype | A61B 8/546 |

FOREIGN PATENT DOCUMENTS

| | | |
|---|---|---|
| CN | 109414249 A | 3/2019 |
| CN | 110383517 A | 10/2019 |
| GP | 778167 A | 7/1957 |
| JP | H7-222285 A | 8/1995 |
| JP | H09-108288 A | 4/1997 |
| JP | 2009-082374 A | 4/2009 |
| KR | 10-1999-0023482 A | 3/1999 |
| KR | 10-2001-0019317 A | 3/2001 |
| KR | 10-2001-0037675 A | 5/2001 |
| KR | 20080094715 A | 10/2008 |
| KR | 10-2012-0055763 A | 6/2012 |
| KR | 20150007519 A | 1/2015 |
| KR | 20190023842 A | 3/2019 |
| WO | 2019/017107 A1 | 1/2019 |

OTHER PUBLICATIONS

Office Action dated Dec. 5, 2022 of the corresponding CN Application No. 202110124237.0.
Office Action dated Jun. 15, 2023 in Chinese Application No. 202110124237.0.

* cited by examiner

MULTI FUNCTIONAL PROBE CAPABLE OF SHIELDING ELECTROMAGNETIC WAVE

CROSS-REFERENCE TO RELATED APPLICATION

This application claims priority to and the benefit of Korean Patent Application No. 10-2020-0011842, filed on Jan. 31, 2020, the disclosure of which is incorporated herein by reference in its entirety.

BACKGROUND

1. Field

The present disclosure relates to a multi-functional probe capable of shielding electromagnetic waves.

2. Discussion of Related Art

With the recent improvement in living level, modern people are paying a great deal of attention to maintaining healthy skin in addition to maintaining healthy bodies. Accordingly, there has been growing interest in skin beauty improvement and anti-aging for skin.

The skin, which is the largest organ in the human body and occupies about 16% of a total volume of the human, serves as an important protective layer which is in direct contact with an external environment and protects the human body from many deadly harmful factors, such as temperature, humidity, and ultraviolet rays, which try to permeate the human body. However, as a person gets older, skin cells are damaged due to various pollutants, intense ultraviolet rays, stress, nutritional deficiencies, and the like, the cells do not proliferate properly, and thus wrinkles are generated on the skin, and loss of elasticity and keratinization occur on the skin.

Korean Patent Application Publication No. 2012-0055763 (Published on Jun. 1, 2012) discloses the related technology.

The disclosure of this section is to provide background information relating to the present disclosure. Applicant does not admit that any information contained in this section constitutes prior art.

SUMMARY

The present disclosure relates to a multi-functional probe capable of shielding electromagnetic waves in which an ultrasonic driver circuit and an ultrasonic oscillation element are surrounded by a shielding member in a state in which the ultrasonic driver circuit and the ultrasonic oscillation element are disposed close to each other and which allows a material of a head, to which ultrasonic waves are transmitted, to be changed to a non-conductive material and prevent moisture from being introduced into the probe.

The present disclosure is directed to providing a multi-functional probe capable of shielding electromagnetic waves, which allows an ultrasonic driver circuit and an ultrasonic oscillation element to be disposed close to each other.

In addition, the present disclosures is directed to providing a multi-functional probe capable of shielding electromagnetic waves, which allows a shielding member to surround such ultrasonic driver circuit and ultrasonic oscillation element.

In addition, the present disclosure is directed to providing a multi-functional probe capable of shielding electromagnetic waves, which allows a material of a head, to which ultrasonic waves are transmitted, to be changed to a non-conductive material.

In addition, the present disclosure is directed to providing a multi-functional probe capable of shielding electromagnetic waves, which may prevent moisture from being introduced into the probe.

According to an aspect of the present invention, provided is a multi-functional probe including a cover part accommodating an ultrasonic driver circuit and an ultrasonic oscillation element, a fixing part fixing the ultrasonic driver circuit and the ultrasonic oscillation element in the cover part, and a shield part configured to block electromagnetic waves generated by the ultrasonic driver circuit and the ultrasonic oscillation element.

In this case, the shield part may include a first shielding member in which a first recessed space is formed to accommodate the ultrasonic driver circuit, and a second shielding member disposed on an upper surface of the first shielding member to cover the first recessed space.

A first flange extending in a radially outward direction may be formed on a circumference of the first shielding member, and a first coupling member simultaneously passing through and coupling the first flange and the second shielding member may be formed on the first flange.

A first coupling hole may be formed in the second shielding member, and a second coupling member, which is coupled to the first coupling hole in a state in which the second coupling member passes through the ultrasonic driver circuit, may be provided on the ultrasonic driver circuit.

The fixing part may include a base to which the ultrasonic driver circuit and the ultrasonic oscillation element are fixed, and a first holder member in which a second flange is formed to extend in a radially outward direction along a circumference of a lower surface of the base, a seating surface on which the second flange is seated may be formed on the cover part, and a third coupling member, which simultaneously passes through and couples the second flange and the seating surface, may be formed on the second flange.

A head against which a skin of a user is pressed may be provided on the ultrasonic oscillation element, and a third shielding member, in which a second recessed space is formed to accommodate the ultrasonic oscillation element, may be provided under the head.

The head may be formed of a non-conductive material.

A fourth coupling member, which is coupled to the third shielding member in a state in which the fourth coupling member passes through the first holder member, may be formed on the second shielding member.

A third coupling hole to which the fourth coupling member is fixed may be formed in the third shielding member.

A light-emitting diode (LED) light source member may be provided between the second shielding member and the first holder member.

A through hole through which LED light passes may be formed in the first holder member, and an LED cover which covers the through hole may be provided on an upper surface of the first holder member.

A hooking side formed to extend in the radially outward direction may be formed on the lower surface of the base, and a third flange, which extends in the radially outward direction to be inserted into the hooking side, may be formed on a circumference of the third shielding member.

A second holder member, which presses the third flange to maintain a state in which the third flange is inserted into the hooking side, may be provided under the first holder member.

A fourth coupling member, which applies a coupling force to allow the second holder member to press the third flange, may be provided on the second shielding member, and the fourth coupling member may be coupled to the base in a state in which the fourth coupling member passes through the second holder member.

The ultrasonic oscillation element may be provided in a central portion of the first holder member, a frequency oscillation member configured to oscillate at a low or medium frequency may be provided along a circumference of the first holder member, and a spacer, by which the ultrasonic oscillation element and the frequency oscillation member are disposed to be spaced apart from each other, may be provided on an upper surface of the first holder member.

A partition wall, which partitions an ultrasonic wave region and a frequency region, may be provided on the spacer.

A fourth flange extending in the radially outward direction may be formed on a circumference of the spacer, and a first support rib, which extends in a radially inward direction along a circumference of the base to form an insertion side into which the fourth flange is inserted, may be formed on an upper surface of the base.

A support column extending downward to pass through the base may be formed on the spacer, and a second coupling hole to which the fourth coupling member is fixedly coupled may be formed in the support column.

A heating member may be provided between the first holder member and the second holder member.

BRIEF DESCRIPTION OF THE DRAWINGS

The above and other aspects, features and advantages of the present invention will become more apparent to those of ordinary skill in the art by describing embodiments thereof in detail with reference to the accompanying drawings, in which.

DETAILED DESCRIPTION OF EMBODIMENTS

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to descriptions are omitted in the drawings in order to clearly explain the present invention, and the same or similar parts are denoted by the same reference numerals throughout this specification.

It should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof. In addition, when an element such as a layer, film, region, plate, or the like is referred to as being "on" another portion, it includes not only the element being directly over another element but also another element being therebetween. Conversely, when an element such as a layer, film, region, plate, or the like is referred to as being "under" another portion, it includes not only the element being directly under another element but also another element being therebetween.

Skin aging is mainly divided into natural aging (or endogenous aging) and exogenous aging, and since the natural aging is influenced by genetic factors, it is difficult to artificially control the natural aging. However, since the exogenous aging is influenced by environmental factors, it is relatively easy to artificially control the exogenous aging. Ultraviolet rays, reactive oxygen species, stress, and the like are known as typical exogenous aging factors.

Accordingly, methods of preventing the exogenous aging are being actively studied, and particularly, efforts to identify substances for preventing or reducing aging are in progress. However, most of these substances may have concerns of safety and stability, or even in the case of substances with excellent safety and stability, clinical efficiency and effects of the substances may be weak and a long usage period may be required for checking visible clinical results. Accordingly, physical methods, such as using various beauty devices, are being studied and to enhance effects of these substances.

Among the beauty devices, a beauty device using ultrasonic waves transmits a signal generated by an ultrasonic wave oscillation circuit to an ultrasonic wave oscillator to generate ultrasonic waves and uses the ultrasonic waves for skin care. However, in an example of the ultrasonic wave beauty device, an ultrasonic wave oscillator is disposed in a probe that a user grips to use and an ultrasonic wave oscillation circuit which generates ultrasonic wave signals is disposed in a separate main body.

Accordingly, when the signals generated by the ultrasonic wave oscillation circuit disposed in the main body are transmitted to the ultrasonic wave oscillator disposed in the probe through a cable, noise may be generated by the cable in a process in which the signals are transmitted as described above, and thus a separate ground may need to be additionally installed in the main body to minimize the noise. Accordingly, there may be a need for improvement in these areas.

Figure 1:
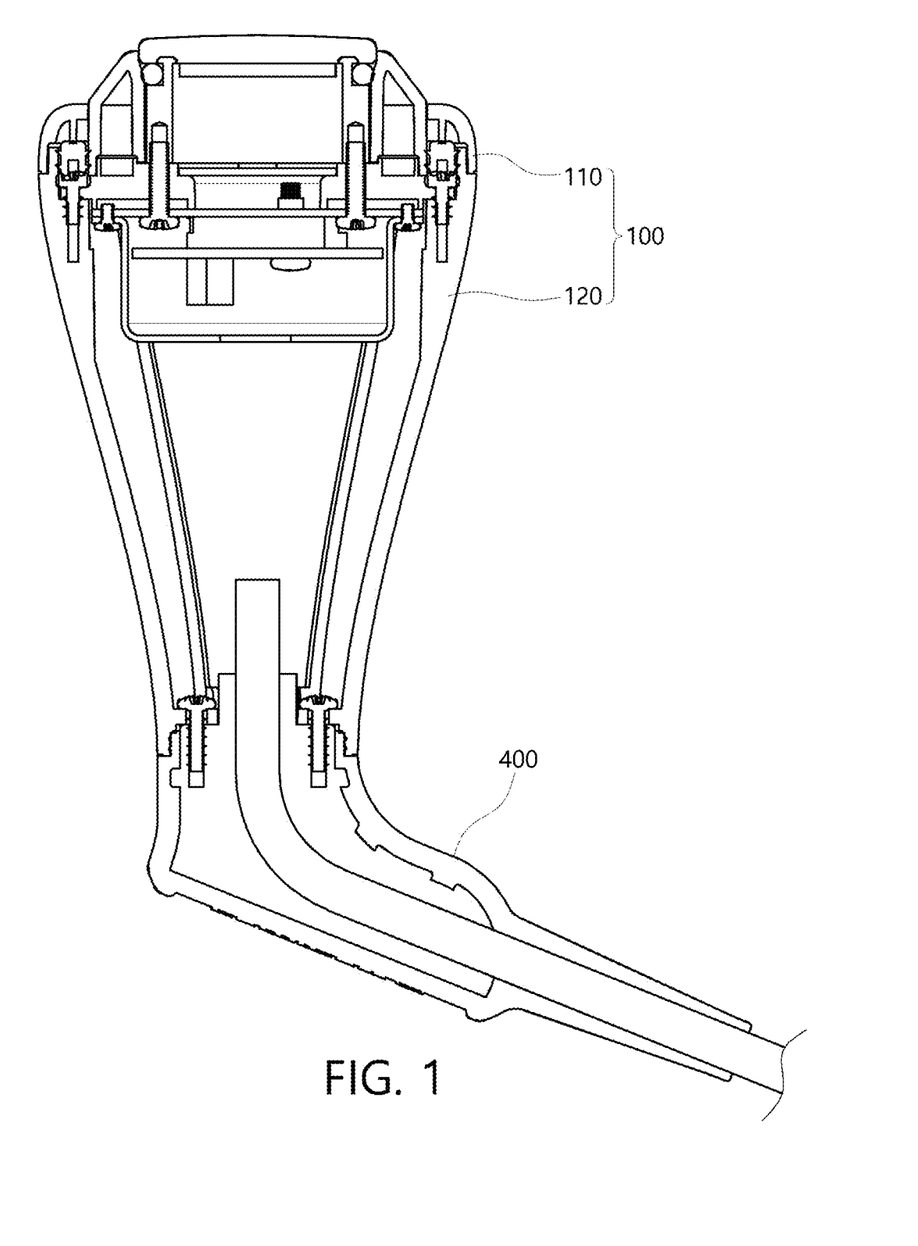
FIG. 1 is a cross-sectional view illustrating a multi-functional probe according to one embodiment of the present invention.
Figure 2:
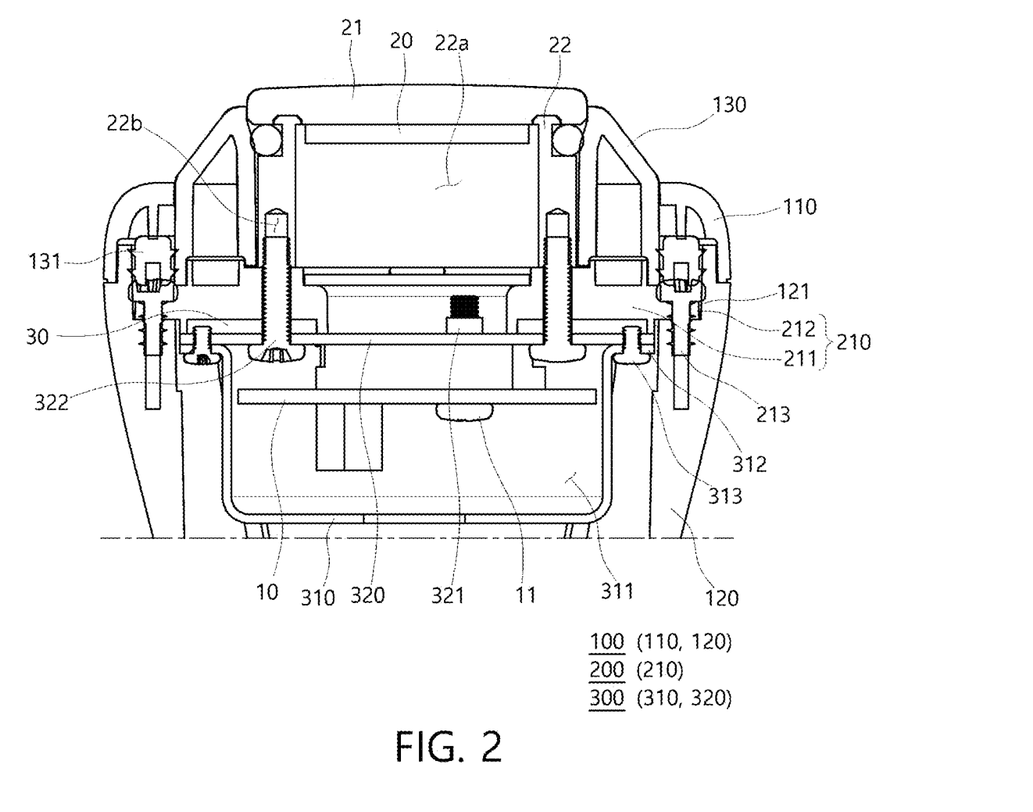
FIG. 2 is an enlarged cross-sectional view illustrating a fixing part and a shield part according to one embodiment of the present invention.
Figure 3:
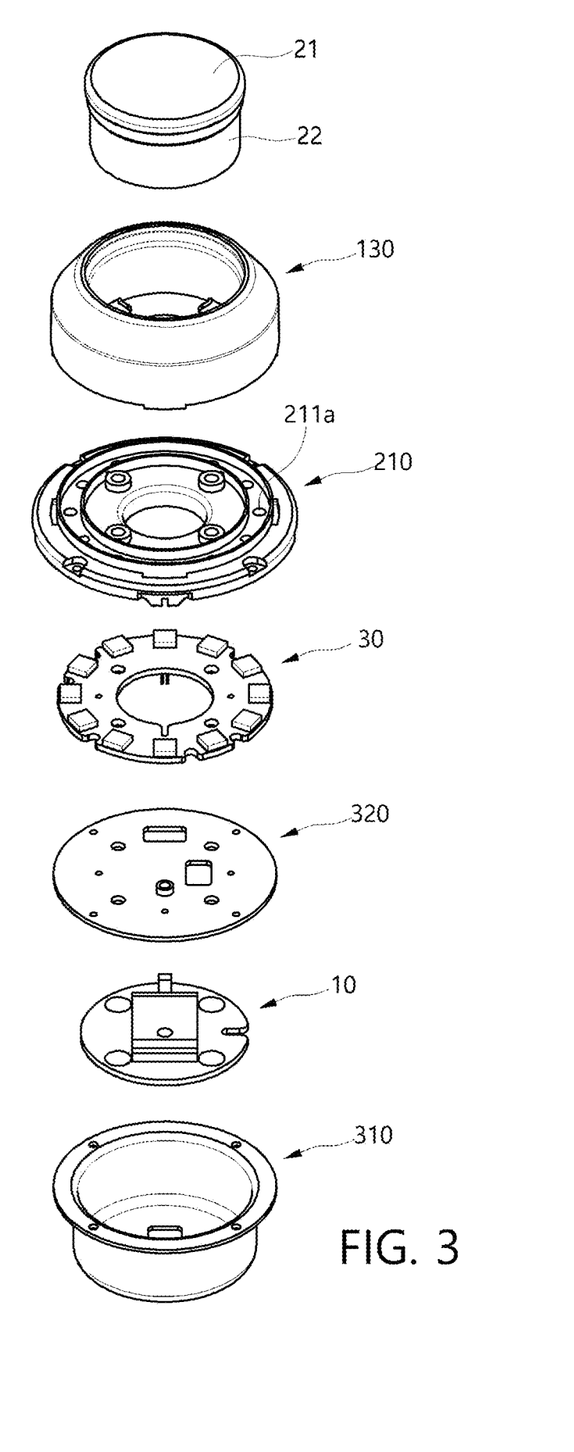
FIG. 3 is an exploded perspective view illustrating the fixing part and the shield part according to one embodiment of the present invention.

FIG. 1 is a cross-sectional view illustrating a multi-functional probe according to one embodiment of the present invention, FIG. 2 is an enlarged cross-sectional view illustrating a fixing part and a shield part according to one embodiment of the present invention, and FIG. 3 is an exploded perspective view illustrating the fixing part and the shield part according to one embodiment of the present invention.

As illustrated in FIG. 1, a multi-functional probe according to embodiments of the present invention includes a cover part 100 that a user may hold with a hand, and the cover part 100 includes an upper cover 110 by which an inner portion of the cover part 100 is opened so that an ultrasonic driver circuit 10 or an ultrasonic oscillation element 20 may be disposed therein and a lower cover 120 which is a part that the user directly holds with the hand. The upper cover 110 may have a structure surrounding a portion of an outer circumferential surface of the lower cover 120 to prevent moisture from being introduced into the multi-functional probe. In addition, as illustrated in FIG. 2, when a sealing member 131 is provided between the upper cover 110 and the lower cover 120, the moisture may be more effectively prevented from being introduced into the probe.

A power supply part 400 for supplying a current to the ultrasonic driver circuit 10 and the like is provided at a rear end of the cover part 100.

As illustrated in FIG. 2, the ultrasonic oscillation element 20 configured to generate ultrasonic waves and emit the ultrasonic waves to the user and the ultrasonic driver circuit 10 configured to transmit a signal to the ultrasonic oscillation element 20 are accommodated in the cover part 100.

In the illustrated embodiments, since both of the ultrasonic driver circuit 10 and the ultrasonic oscillation element 20 are accommodated in the cover part 100 and disposed close to each other, noise generation may be minimized.

A fixing part 200 for fixing the ultrasonic driver circuit 10 and the ultrasonic oscillation element 20 is provided in the cover part 100. A detailed structure of the cover part 100 will be described below.

In addition, as described above, a shield part 300 configured to block electromagnetic waves generated by the ultrasonic driver circuit 10 and the ultrasonic oscillation element 20 is provided in the cover part 100. The shield part 300 blocks noise through a method of surrounding the ultrasonic driver circuit 10 and the ultrasonic oscillation element 20, and since the noise does not leak to the outside, a separate ground is not needed.

As illustrated in FIG. 2, the shield part 300 may include a first shielding member 310, in which a first recessed space 311 is formed to accommodate the ultrasonic driver circuit 10, and a second shielding member 320 disposed on an upper surface of the first shielding member 310 to cover the first recessed space 311.

In embodiments, in a state in which the ultrasonic driver circuit 10 is accommodated in the first recessed space 311 of the first shielding member 310, when the first recessed space 311 is closed using the second shielding member 320, noise generated by the ultrasonic driver circuit 10 does not leak to the outside of the first shielding member 310 and the second shielding member 320.

In this case, as illustrated in FIG. 2, a first flange 312 extending in a radially outward direction may be formed on a circumference of the first shielding member 310, and a first coupling member 313 simultaneously passing through and coupling the first flange 312 and the second shielding member 320 may be provided on the first flange 312.

In embodiments, when the first flange 312 is formed to extend from the circumference of the first shielding member 310 in the radially outward direction, and the second shielding member 320 is disposed on the upper surface of the first shielding member 310, the first flange 312 and the second shielding member 320 are in surface-contact with each other, and in this state, when the first coupling member 313 simultaneously passes through and couples the first flange 312 and the second shielding member 320, noise leakage may be effectively prevented.

In this case, as illustrated in FIG. 2, a first coupling hole 321 is formed in the second shielding member 320, and a second coupling member 11 coupled to the first coupling hole 321 in a state in which the first coupling hole 321 passes through the ultrasonic driver circuit 10 may be provided on the ultrasonic driver circuit 10.

In embodiments, the ultrasonic driver circuit 10 is pressed against a lower surface of the second shielding member 320 by the second coupling member 11, and a voltage of +24 V is applied to the second coupling member 11. The voltage of +24 V applied to the second coupling member 11 is a voltage applied regardless of a current which drives the ultrasonic driver circuit 10 and is applied to the first coupling member 313 coupling the second shielding member 320 and the first flange 312 through the second shielding member 320 and to the first shielding member 310 through the first coupling member 313. In embodiments, the voltage of +24 V applied to the second coupling member 11 is applied to the first shielding member 310 and the second shielding member 320, and in this state, noise generated when the ultrasonic driver circuit 10 operates does not leak to the outside and is absorbed by the first shielding member 310 and the second shielding member 320 to further improve an effect of shielding electromagnetic waves.

As illustrated in FIG. 2, the fixing part 200 includes a first holder member 210 in which a base 211, to which the ultrasonic driver circuit 10 and the ultrasonic oscillation element 20 are fixed, and a second flange 212 formed to extend along a circumference of a lower surface of the base 211 in the radially outward direction are provided.

In addition, a seating surface 121 on which the second flange 212 is seated may be provided on the cover part 100, and a third coupling member 213 simultaneously passing through and coupling the second flange 212 and the seating surface 121 may be provided on the second flange 212.

In the embodiments discussed herein, since both of the ultrasonic driver circuit 10 and the ultrasonic oscillation element 20 are fixed to the base 211 of the first holder member 210, the ultrasonic driver circuit 10 and the ultrasonic oscillation element 20 are disposed close to each other so that noise generation is minimized. In addition, in a state in which the second flange 212 formed on the first holder member 210 is seated on the seating surface 121 formed on the cover part 100, the third coupling member 213 passes through and couples the second flange 212 and the seating surface 121, and thus the first holder member 210 may be stably fixed to the cover part 100.

In this case, as illustrated in FIG. 2, a head 21 which will be pressed against the skin of the user may be provided on the ultrasonic oscillation element 20, and a third shielding member 22 in which a second recessed space 22a for accommodating the ultrasonic oscillation element 20 is formed may be provided under the head 21.

In embodiments, when a signal is transmitted from the ultrasonic driver circuit 10, the ultrasonic oscillation element 20 generates ultrasonic waves, and the ultrasonic waves generated as described above are emitted to the user through the head 21 pressed against the skin of the user.

Noise is generated in a process in which the ultrasonic waves are generated by the ultrasonic oscillation element 20, and the third shielding member 22 is provided in order to prevent the noise from leaking to the outside as described above. As illustrated in FIG. 3, a second recessed space 22a for accommodating the ultrasonic oscillation element 20 is formed in the third shielding member 22.

In this case, the head 21 which will be pressed against the skin of the user may be formed of a non-conductive material such as ceramic, and when the head 21 is formed of the non-conductive material as described, a current is prevented from flowing therein so that the head 21 may be insulated.

In this case, the third shielding member 22 may also be formed so that the voltage of +24 V is applied thereto as described above. To this end, a fourth coupling member 322 coupled to the third shielding member 22 in a state in which the fourth coupling member 322 passes through the second shielding member 320 may be provided on the first holder member 210.

As described above, components related to the generation of the ultrasonic waves are fixed in the cover part 100 by the first holder member 210, and the fourth coupling member 322 passing through the first holder member 210 is provided on the second shielding member 320 so that a position of the first holder member 210 may be fixed in the cover part 100. In addition, the fourth coupling member 322 is coupled to the third shielding member 22 in a state in which the fourth coupling member 322 passes through the first holder member 210, and thus a position of the third shielding member 22 may be stably fixed in the cover part 100.

In addition, as described above, since the voltage of +24 V is applied to the second shielding member 320, the voltage of +24 V is also applied to the fourth coupling member 322 provided on the second shielding member 320, and the voltage of +24 V applied to the fourth coupling member 322 is applied to the third shielding member 22. Since the voltage of +24 V is also applied to the third shielding member 22, noise generated in a process in which ultrasonic waves are generated by the ultrasonic oscillation element 20 does not leak to the outside and are absorbed by the third shielding member 22 to further improve an effect of shielding electromagnetic waves.

In this case, as illustrated in FIG. 2, a third coupling hole 22b may be formed in the third shielding member 22, and the fourth coupling member 322 is fixed to the third coupling hole 22b so that a mutual fixing state thereof may be stable.

In this case, a light-emitting diode (LED) light source member 30 may be provided between the second shielding member 320 and the first holder member 210, and the user may use LED light emitted from the LED light source member 30 with the ultrasonic waves for skin care and skin treatment.

The LED light source member 30 may be formed to include an LED configured to emit light in a visible light range and an LED configured to emit light in an ultraviolet light range. Since the multi-functional probe is for skin care and skin treatment, the multi-functional probe may be a probe capable of emitting light having effects of skin stimulation, sterilization, blood circulation promotion, and the like.

Blue light which is emitted by the LED light source member 30 and of which a wavelength is typically in the range of 405 to 420 nm is absorbed by epidermal tissue of the skin and stimulates porphyrin to increase an amount of single oxygen in cells so that bacteria are destroyed. The light in a band of the wavelength has an advantage of relieving skin conditions such as acne.

Red light which is emitted by the LED light source member 30 and of which a wavelength is typically in the range of 630 to 640 nm permeates to dermal tissue of the skin, and about 80% of light energy is absorbed in 2 mm thereof. The red light stimulates mitochondria and activates adenosine triphosphate (ATP) generation so that cellular turnover, superficial circulation, anti-inflammatory emission, and the like are induced.

Infrared light which is emitted by the LED light source member 30 and of which a wavelength is typically in the range of 800 to 900 nm permeates the skin deeper than the blue or red light, and a temperature of cells in the skin, in which the light in a band of the wavelength permeates, increases so that effects of pain relief, activation of skin cell regeneration, and the like may be expected.

As illustrated in FIG. 3, a through hole 211a through which the LED light passes may be formed in the first holder member 210, the light emitted by the LED light source member 30 is emitted to the user, and an LED cover 130 which covers the through hole 211a may be provided on an upper surface of the first holder member 210 to prevent external foreign matter from being introduced thereinto through the through hole 211a.

Figure 4:
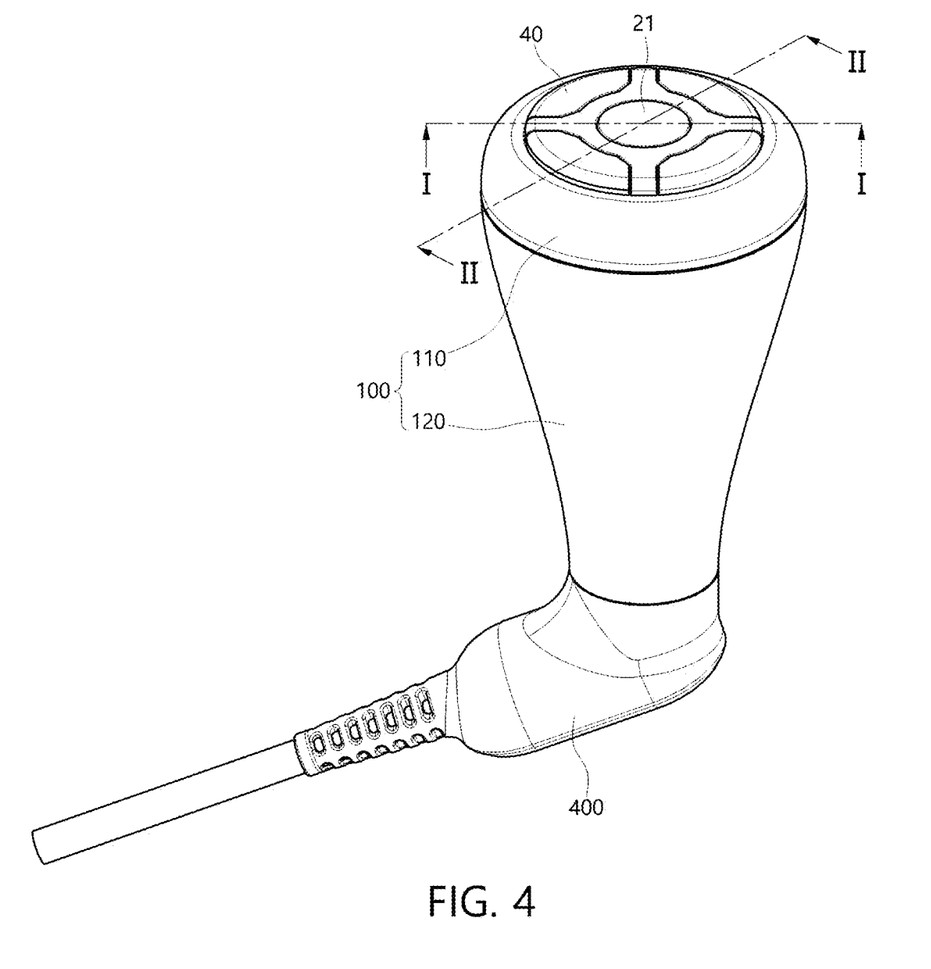
FIG. 4 is a perspective view illustrating a multi-functional probe according to another embodiment of the present invention.
Figure 5:
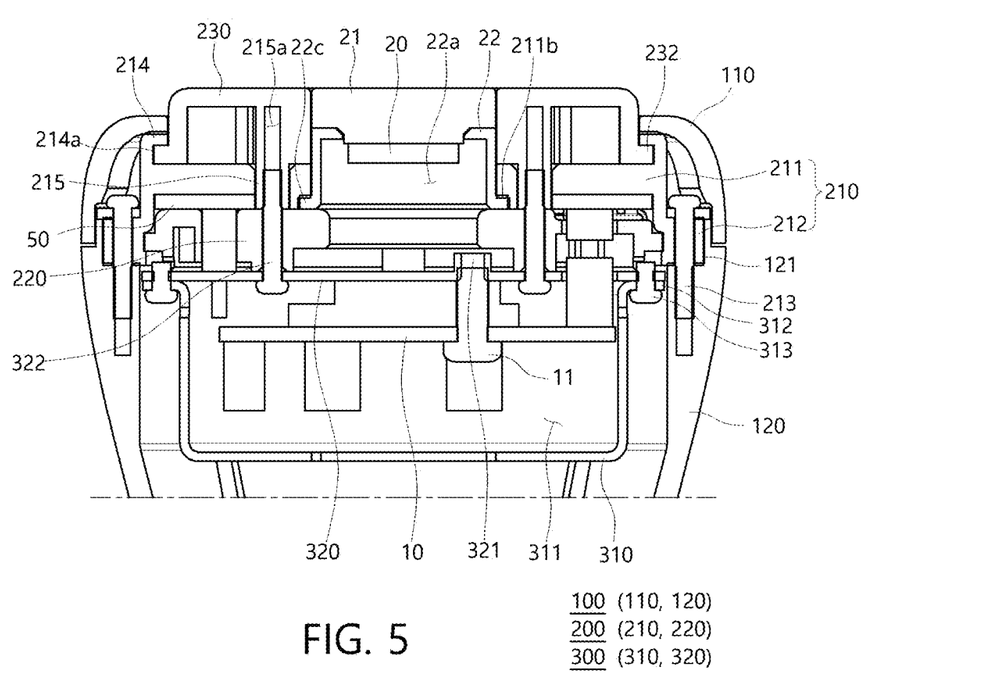
FIG. 5 is an enlarged cross-sectional view illustrating a fixing part and a shield part according to another embodiment of the present invention, that is, a cross-sectional view taken along line I-I of FIG. 4.
Figure 6:
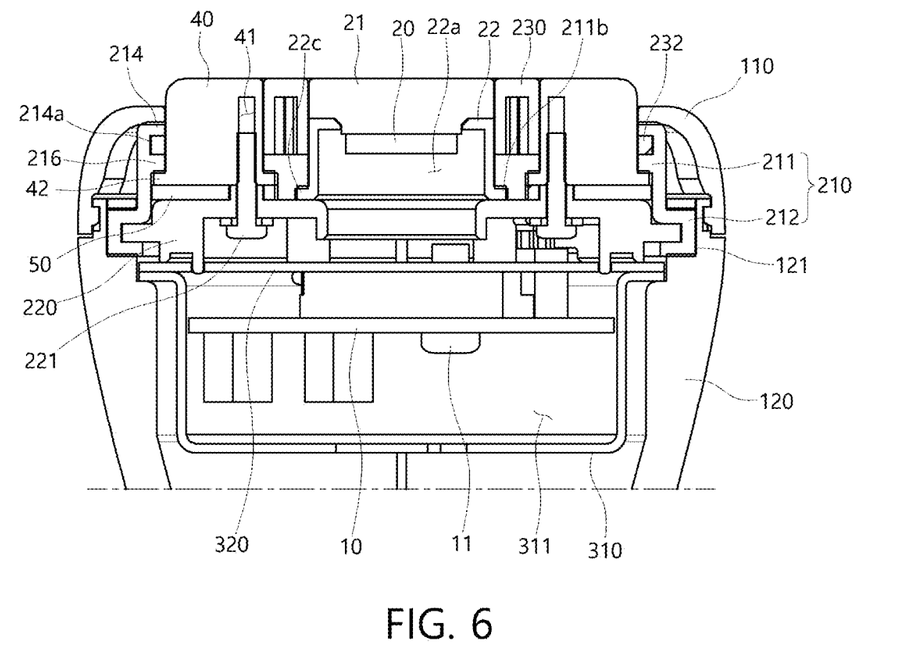
FIG. 6 is a cross-sectional view illustrating the fixing part and the shield part according to another embodiment of the present invention, that is, a cross-sectional view taken along line II-II of FIG. 4.
Figure 7:
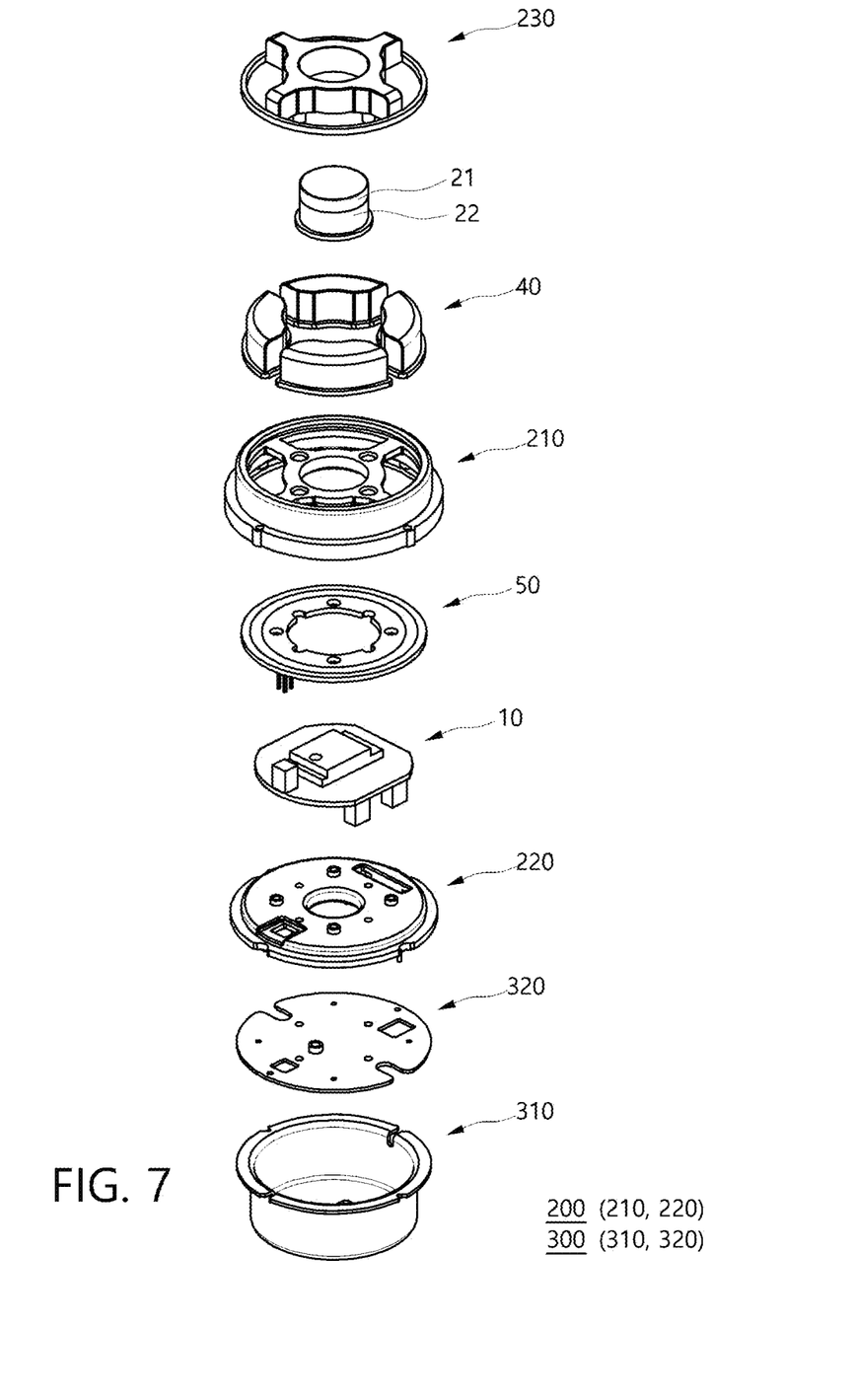
FIG. 7 is an exploded perspective view illustrating the fixing part and the shield part according to another embodiment of the present invention.
Figure 8:
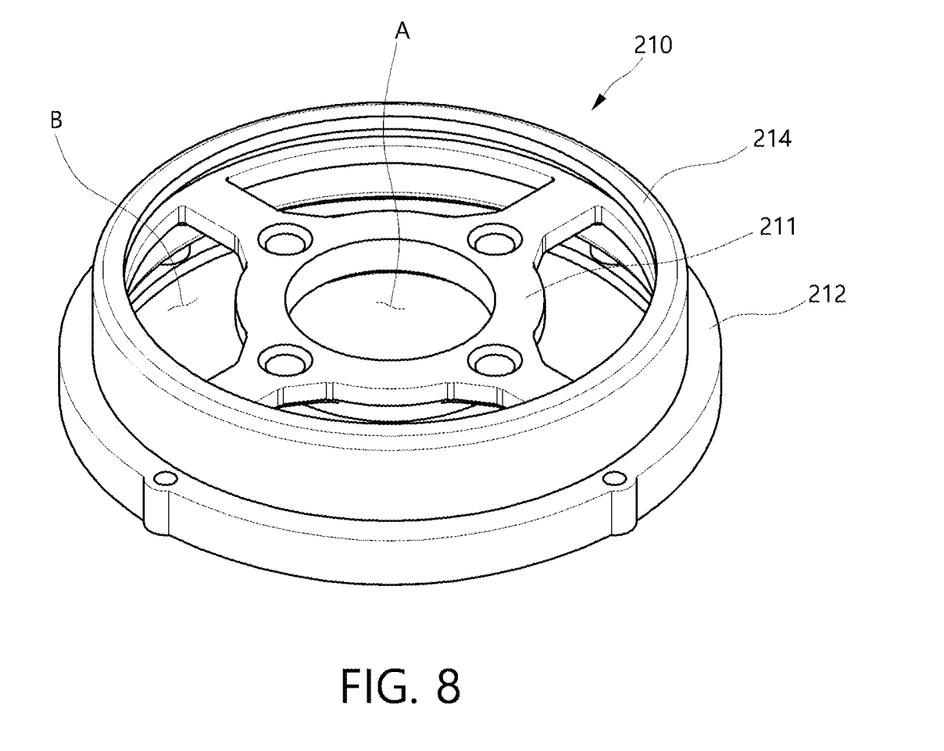
FIG. 8 is an enlarged perspective view illustrating a first holder member according to another embodiment of the present invention.
Figure 9:
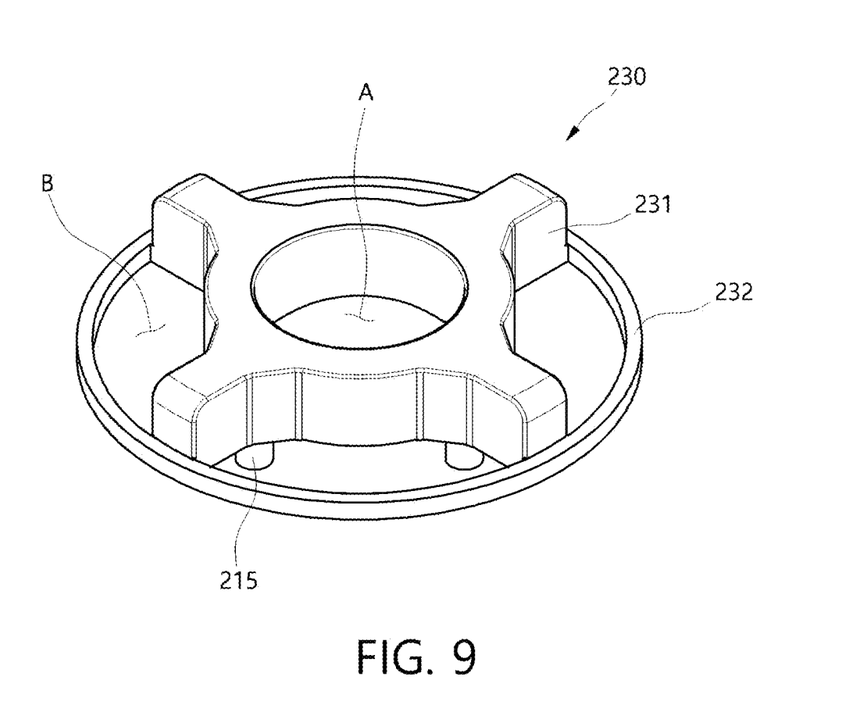
FIG. 9 is an enlarged perspective view illustrating a spacer according to another embodiment of the present invention.

FIG. 4 is a perspective view illustrating a multi-functional probe according to another embodiment of the present invention, FIG. 5 is an enlarged cross-sectional view illustrating a fixing part and a shield part according to another embodiment of the present invention, that is, a cross-sectional view taken along line I-I of FIG. 4, FIG. 6 is a cross-sectional view illustrating the fixing part and the shield part according to another embodiment of the present invention, that is, a cross-sectional view taken along line II-II of FIG. 4, FIG. 7 is an exploded perspective view illustrating the fixing part and the shield part according to another embodiment of the present invention, FIG. 8 is an enlarged perspective view illustrating a first holder member according to another embodiment of the present invention, and FIG. 9 is an enlarged perspective view illustrating a spacer according to another embodiment of the present invention.

As illustrated in FIG. 4, a multi-functional probe according to another embodiment of the present invention also includes a cover part 100 that a user may hold with a hand, and the cover part 100 also includes an upper cover 110 and a lower cover 120 so that an ultrasonic driver circuit 10, an ultrasonic oscillation element 20, or the like may be disposed in the cover part 100.

When symbols of components of the multi-functional probe according to another embodiment of the present invention are the same as those of the multi-functional probe according to one embodiment of the present invention, since the components according to another embodiment correspond to those according to one embodiment of the present invention, detailed descriptions thereof will be omitted.

In this case, as illustrated in FIG. 5, a hooking side 211b formed to extend in a radially outward direction may be formed on a lower surface of a base 211, and a third flange 22c extending in the radially outward direction may be formed on a circumference of a third shielding member 22 to be inserted into the hooking side 211b.

Since the third flange 22c formed on the third shielding member 22 is provided to be hooked on the lower surface of the base 211 as described above, the third shielding member 22 may be stably fixed.

In addition, as illustrated in FIG. 5, a second holder member 220, which presses the third flange 22c to maintain a state in which the third flange 22c is inserted into the hooking side 211b, is provided under a first holder member 210 so that the third shielding member 22 is more stably fixed.

In this case, as illustrated in FIG. 6, a fifth coupling member 221 capable of fixing a frequency oscillation member 40 may be provided on the second holder member 220, and the fifth coupling member 221 may be coupled to a fourth coupling hole 41 formed in the frequency oscillation member 40 in a state in which the fifth coupling member 221 passes through the second holder member 220.

A fifth flange 42 extending in the radially outward direction may be formed in order to firmly fix the frequency oscillation member 40, and the fifth flange 42 may be disposed to be hooked on a second support rib 216 formed on the base 211 so that the frequency oscillation member 40 may be stably fixed.

In addition, a fourth coupling member 322, which applies a coupling force to allow the second holder member 220 to press the third flange 22c, may be formed in the second shielding member 320, and the fourth coupling member 322 may be coupled to the base 211 in a state in which the fourth coupling member 322 passes through the second holder member 220 so that the second holder member 220 may be stably fixed.

As illustrated in FIG. 4, the ultrasonic oscillation element 20 may be provided on a central portion of the first holder member 210, and the frequency oscillation member 40 configured to oscillate at a low or medium frequency may be provided along a circumference of the first holder member 210.

In embodiments, the frequency oscillation member 40 oscillates at the low or medium frequency, and the low frequency generally denotes a frequency of 1 to 1,000 Hz, includes various low-intensity frequencies which alleviate disharmony in a body, and is directly applied to the body to prevent and manage cellulite and strengthen a structure of skin and elastin as well as muscles.

A heating effect, a chemical effect, and a physical effect are physiological effects of the low frequency. Blood circulation is promoted and blood vessels are strengthened due to the heating effects, and collagen, which is a kind of protein, is synthesized and acidity balance is regulated due to the chemical effect. Cells are activated and skin elasticity is increased due to the physical effect.

In addition, the medium frequency is a kind of frequency like the low frequency, and a frequency thereof ranges from 1,000 to 10,000 Hz. Such a medium frequency induces lymph drainage action like the low frequency and permeates deeper than the low frequency to transmit a soft stimulus to the human body.

In this case, as illustrated in FIG. 7, a spacer 230, by which the ultrasonic oscillation element 20 and the frequency oscillation member 40 are disposed to be spaced apart from each other, may be provided on an upper surface of the first holder member 210.

As illustrated in FIG. 9, a partition wall 231, which partitions an ultrasonic wave region A and a frequency region B, may be provided in the spacer 230, and since the partition wall is provided, the ultrasonic oscillation element 20 and the frequency oscillation member 40 may be disposed to be spaced apart from each other.

In order to stably fix the spacer 230, as illustrated in FIG. 9, a fourth flange 232 extending in the radially outward direction is formed on a circumference of the spacer 230.

In addition, as illustrated in FIG. 8, a first support rib 214, which extends in a radially inward direction along a circumference of the base 211 so that an insertion side 214a into which the fourth flange 232 is inserted is formed, is formed on an upper surface of the base 211, and thus the spacer 230 is stably fixed.

In addition, a support column 215 extending downward to pass through the base 211 may be formed on the spacer 230, and a second coupling hole 215a fixedly coupled to the fourth coupling member 322 may be formed in the support column 215.

Accordingly, the first holder member 210 and the second holder member 220, which are disposed between the second shielding member 320 and the spacer 230, and the components coupled to the holder members may be firmly fixed.

In addition, a heating member 50 may be provided between the first holder member 210 and the second holder member 220 to provide a heating effect as well as an ultrasonic wave effect.

In a multi-functional probe capable of shielding electromagnetic waves, which has the above-described structure, according to embodiments of the present invention, since an ultrasonic driver circuit and an ultrasonic oscillation element are disposed close to each other, noise generation is minimized, and since the ultrasonic driver circuit and the ultrasonic oscillation element are surrounded by a shielding member, generated noise is blocked not to leak to the outside, and thus an additional ground is not needed.

In addition, since a head to which ultrasonic waves are transmitted is formed of a non-conductive material, the head can be insulated.

In addition, since a sealing member is provided, moisture can be effectively prevented from being introduced into the probe.

While embodiments of the present invention have been described above, the spirit of the present invention is not limited to the embodiments proposed in this specification, and other embodiments may be easily suggested by adding, changing, and deleting components by those skilled in the art and will fall within the spiritual range of the present invention.

What is claimed is:

1. A multi-functional probe comprising:
   an ultrasonic oscillation element;
   an ultrasonic driver circuit configured to drive the ultrasonic oscillation element;
   a cover part configured to accommodate the ultrasonic driver circuit and the ultrasonic oscillation element;
   a fixing part configured to fix the ultrasonic driver circuit and the ultrasonic oscillation element in the cover part; and
   a shield part configured to block electromagnetic waves generated by the ultrasonic driver circuit and the ultrasonic oscillation element,
   wherein the shield part comprises:
      a first shielding member comprising a first recessed space formed to accommodate the ultrasonic driver circuit and surrounding side and lower portions of the ultrasonic driver circuit,
      a second shielding member disposed over an upper surface of the first shielding member to cover an upper portion of the ultrasonic driver circuit and the first recessed space and to form surface contact with the first shielding member, the second shielding member being interposed between the ultrasonic driver circuit and the ultrasonic oscillation element,
a head disposed over the ultrasonic oscillation element and configured to be pressed against a skin of a user, and
a third shielding member comprising a second recessed space to accommodate the ultrasonic oscillation element and to be divided from the first recessed space, the third shielding member being disposed under the head,
wherein the first shielding member comprises,
a body defining the first recessed space and comprising a circumference, and
a flange extending in a radially outward direction from the circumference, and
wherein the shield part further comprises a coupling member that passes through (a) the flange of the first shielding member and (b) the second shielding member placed over the flange such that the coupling member couples the first shielding member and the second shielding member together and further such that noise generated by the ultrasonic driver circuit does not leak to the outside and is instead absorbed by the first shielding member and the second shielding member, the coupling member having a length that is longer than a sum of (i) a thickness of the flange of the first shielding member where the coupling member passes through the flange, and (ii) a thickness of the second shielding member where the coupling member passes through the second shielding member,
wherein the multi-functional probe further comprises an additional coupling member configured to couple the second shielding member and the third shielding member to form a sub-assembly.

2. The multi-functional probe of claim 1, further comprising a ultrasonic driver circuit coupling member configured to couple the ultrasonic driver circuit and the second shielding member,
wherein the second shielding member comprises a coupling hole, and
wherein the ultrasonic driver circuit coupling member coupled to the coupling hole in a state in which the ultrasonic driver circuit coupling member passes through the ultrasonic driver circuit.

3. The multi-functional probe of claim 1, wherein the fixing part comprises a first holder member which comprises:
a base to which the ultrasonic driver circuit and the ultrasonic oscillation element are fixed, and
a flange distinct from the flange of the first shielding member and extending in a radially outward direction from a circumference of the base distinct from the circumference of the body of the first shielding member;
wherein the cover part comprises a seating surface, on which the flange of the first holder member is seated, and
wherein the fixing part further comprises a holder coupling member configured to couple the flange of the first holder member and the seating surface.

4. The multi-functional probe of claim 3, wherein the additional coupling member is configured to couple the second shielding member, the first holder member, and the third shielding member.

5. The multi-functional probe of claim 4, wherein the third shielding member comprises a coupling hole to which the additional coupling member is fixed.

6. The multi-functional probe of claim 4, further comprising a light-emitting diode (LED) light source member is provided between the second shielding member and the first holder member.

7. The multi-functional probe of claim 6,
wherein the first holder member comprises a through hole through which LED light passes, and
wherein the cover part comprises an LED cover configured to cover the through hole.

8. The multi-functional probe of claim 4, further comprising:
a frequency oscillation member configured to oscillate and provided along the circumference of the base of the first holder member; and
a spacer provided on an upper surface of the first holder member,
wherein the ultrasonic oscillation element and the frequency oscillation member are disposed to be spaced apart from each other by the spacer, and
wherein the ultrasonic oscillation element is provided in a central portion of the first holder member.

9. The multi-functional probe of claim 8, wherein the spacer comprises a partition wall partitioning a first region for the ultrasonic oscillation element and a second region for the frequency oscillation member.

10. The multi-functional probe of claim 9,
wherein the spacer comprises a flange distinct from the flange of the first shielding member and extending in the radially outward direction, and
wherein the base comprises a first support rib, which extends in a radially inward direction to form an insertion side into which the flange of the spacer is inserted.

11. The multi-functional probe of claim 10, wherein the spacer comprises:
a support column extending downward to pass through the base is formed on the spacer.

12. The multi-functional probe of claim 3,
wherein the base comprises a hooking side formed to extend in the radially outward direction; and
wherein the third shielding member comprises a flange distinct from the flange of the first shielding member, distinct from the flange of the first holder member, and configured to be inserted into the hooking side.

13. The multi-functional probe of claim 12, wherein the fixing part further comprises a second holder member configured to press the flange of the third shielding member to maintain a state in which the flange of the third shielding member is inserted into the hooking side.

14. The multi-functional probe of claim 13,
wherein the second shielding member comprises the coupling member configured to apply a coupling force to allow the second holder member to press the flange of the third shielding member, and
wherein the coupling member of the second shielding member is coupled to the base in a state in which the coupling member of the second shielding member passes through the second holder member.

15. The multi-functional probe of claim 13, further comprising a heating member provided between the first holder member and the second holder member.

16. The multi-functional probe of claim 1, wherein the head is formed of an electrically non-conductive material.

17. The multi-functional probe of claim 1, wherein the fixing part comprises a first holder member which comprises:
- a base to which the ultrasonic driver circuit is fixed, and
- a flange distinct from the flange of the first shielding member and extending in a radially outward direction from a circumference of the base distinct from the circumference of the body of the first shielding member;
- wherein the cover part comprises a seating surface, on which the flange of the first holder member is seated, and
- wherein the fixing part further comprises a holder coupling member configured to couple the flange of the first holder member and the seating surface,
- wherein the additional coupling member is configured to couple the second shielding member, the first holder member, and the third shielding member,
- wherein the first holder member comprises a portion which, in a coupled state, is interposed of the second shielding member and the third shielding member,
- wherein the portion of the first holder member comprises a hole through which the additional coupling member passes.

18. The multi-functional probe of claim 1, wherein a voltage is applied to the second shielding member, and the voltage is further applied to the first shielding member and the third shielding member via the coupling member and the additional coupling member, respectively.

* * * * *